US010303505B2

(12) United States Patent
Cradick et al.

(10) Patent No.: US 10,303,505 B2
(45) Date of Patent: May 28, 2019

(54) ADJUSTING A COMPUTING ENVIRONMENT FOR PROCESSING A DATA STREAM WITH DUMMY TUPLES

(71) Applicant: International Business Machines Corporation, Armonk, NY (US)

(72) Inventors: Ryan K. Cradick, Oronoco, MN (US); Cory J. Kleinheksel, Ames, IA (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 15/159,358

(22) Filed: May 19, 2016

(65) Prior Publication Data

US 2017/0337067 A1    Nov. 23, 2017

(51) Int. Cl.
*G06F 9/46*      (2006.01)
*G06F 9/50*      (2006.01)
*G06F 11/30*     (2006.01)

(52) U.S. Cl.
CPC .............. *G06F 9/46* (2013.01); *G06F 9/5005* (2013.01); *G06F 11/30* (2013.01)

(58) Field of Classification Search
None
See application file for complete search history.

(56) References Cited

U.S. PATENT DOCUMENTS

| 5,740,463 | A | 4/1998 | Oshima et al. |
| 8,661,449 | B2 | 2/2014 | Rossbach et al. |
| 9,152,689 | B2 | 10/2015 | Branson et al. |
| 2004/0258393 | A1 | 12/2004 | Lin et al. |
| 2007/0086485 | A1* | 4/2007 | Vega-Garcia ........... H04L 29/06 370/468 |
| 2008/0071716 | A1 | 3/2008 | Anderson et al. |
| 2012/0128062 | A1 | 5/2012 | Mehta et al. |
| 2012/0218268 | A1* | 8/2012 | Accola .................. G06F 9/5011 345/440 |
| 2013/0046912 | A1* | 2/2013 | Pell ..................... G06F 11/3636 710/305 |
| 2014/0278337 | A1* | 9/2014 | Branson .............. G06F 11/3457 703/22 |

OTHER PUBLICATIONS

Sakr, Sherif. "An Introduction to InfoSphere Streams." DeveloperWorks. May 7, 2013. Accessed Feb. 16, 2018. https://www.ibm.com/developerworks/library/bd-streamsintro/index.html.*

Harrison et al., "Optimising data movement rates for parallel processing applications on graphics processors." Parallel and Distributed Computing and Networks. 2007.

(Continued)

*Primary Examiner* — Kim Huynh
*Assistant Examiner* — Joshua Neveln
(74) *Attorney, Agent, or Firm* — Robert Bunker; Edell, Shapiro & Finnan, LLC

(57) ABSTRACT

Adjusting a computing environment for processing a data stream involves identifying one or more dummy tuples in the data stream processed by the computing environment. Propagation of the identified dummy tuples to be processed through a plurality of operators in the computing environment is controlled in order to control adjustment of the computing environment. The computing environment is adjusted based on the processing of the propagated dummy tuples.

20 Claims, 8 Drawing Sheets

(56) References Cited

OTHER PUBLICATIONS

Dindar et al. "Modeling the execution semantics of stream processing engines with SECRET." The VLDB Journal 22.4 (2013): 421-446.
Hirzel et al. "A catalog of stream processing optimizations." ACM Computing Surveys (CSUR) 46.4 (2014): 46.
Li et al. "Proof-infused streams: Enabling authentication of sliding window queries on streams." Proceedings of the 33rd international conference on Very large data bases.
Li et al. "Deadlock-avoidance for Streaming Applications with Split-Join Structure: Two Case Studies." Department of Computer Science and Engineering Washington University in St. Louis. 2010. pp. 333-336.
Khandekar et al., "COLA: Optimizing Stream Processing Applications via Graph Partitioning." IFIP International Federation for Information Processing, 2009, pp. 308-327.
Botan et at. "SECRET: A Model for Analysis of the Execution Semantics of Stream Processing Systems." Proceedings of the VLDB Endowment, vol. 3, No. 1. 2010. 12 pages.
Gulisano et al. "StreamCloud: A Large Scale Data Streaming System" International Conference on Distributed Computing Systems. 2010. 13 pages.

\* cited by examiner

ADJUSTING A COMPUTING ENVIRONMENT FOR PROCESSING A DATA STREAM WITH DUMMY TUPLES

BACKGROUND

Present invention embodiments relate to stream computing and, in particular, to adjusting stream computing environments by controlling tuples within the streaming data.

Generally, stream computing processes continuously flowing or streaming data. Consequently, stream computing is most appropriate where there are very large volumes of streaming data that need to be processed in very short amounts of time. For example, stream processing enables the development and execution of applications that process information in data streams. In addition, stream computing enables continuous and fast analysis of massive volumes of moving data to help improve the speed of business insight and decision-making.

Stream processing application graphs are generally made up of: (1) operators that apply some logic to a stream input and generate a stream output; (2) streams that carry data from one operator to another; and (3) tuples, which are segments of data that flow through a stream. Each tuple has a set of attribute name value pairs. These application graphs typically operate in stream processing environments that are flexible, such that the environment can adapt or adjust to the applications operating in the environment. However, often, the environment only adjusts in response to a problem, not in anticipation of a problem. Consequently, a stream computing environment may experience delays or other performance issues when processing loads or flows moving therethrough.

SUMMARY

According to one embodiment of the present invention, adjusting a computing environment for processing a data stream involves identifying one or more dummy tuples in the data stream processed by the computing environment. Propagation of the identified dummy tuples to be processed through a plurality of operators in the computing environment is controlled in order to control adjustment of the computing environment. The computing environment is adjusted based on the processing of the propagated dummy tuples.

BRIEF DESCRIPTION OF THE DRAWINGS

Generally, like reference numerals in the various figures are utilized to designate like components.

DETAILED DESCRIPTION

Figure 1:
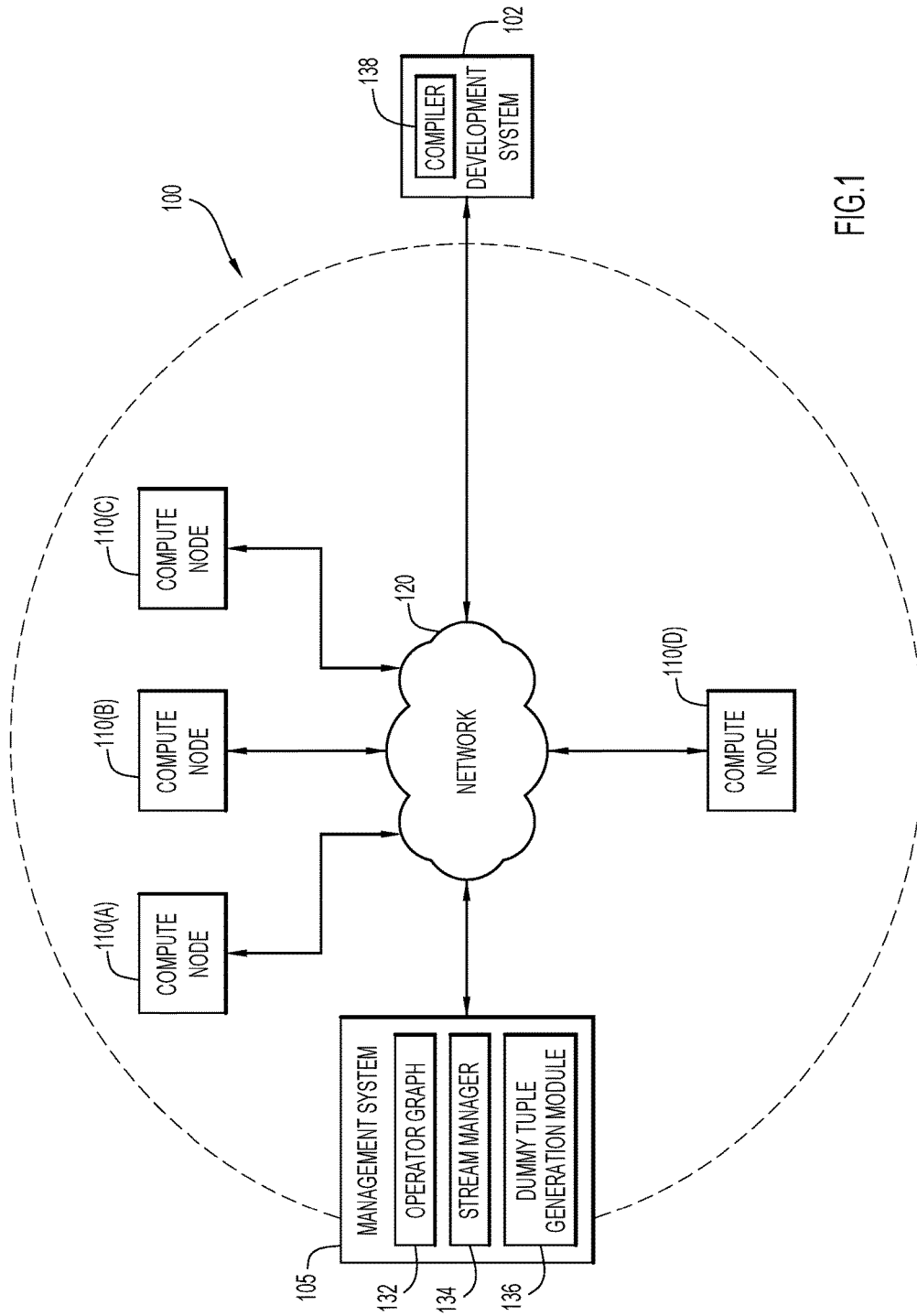
FIG. 1 illustrates an example environment in which the present general inventive concept can be embodied.

Presented herein are techniques for adjusting a computing environment that is configured to process data streams (referred to herein as a stream computing environment). Generally, the techniques provided herein control propagation of dummy tuples through a plurality of operators in order to control resource distribution within a stream computing environment. For example, if historical records indicate that a certain application operating in the stream computing environment requires additional resources at a certain time, techniques provided herein may generate and/or control propagation of dummy tuples in order to adjust the computing environment to provide the appropriate resources before or at the certain time (as opposed to adjusting thereafter).

Put another way, the techniques provided herein artificially manipulate streaming analytics in a runtime environment in order to efficiently allocate resources from the stream computing environment. As is described in further detail below, the runtime environment is manipulated by providing an operator framework that maintains the operators while identifying and processing dummy tuples in substantially the same manner as regular tuples. Additionally, the operator framework allows an application or the infrastructure to introduce dummy tuples, and allows current tuples to be replicated into dummy tuples so that similar processing occurs.

Advantageously, generating and controlling propagation of a dummy tuple flow can influence the dynamic infrastructure of a stream computer environment to make adjustments before the environment itself would recognize that a change needs to be made (e.g., without the dummy tuples). Consequently, the environment is dynamically adjusted to efficiently handle incoming data streams. By comparison, conventional techniques typically examine the entire operator flow, operator processing, and environment metrics before recognizing that resources may be inefficiently deployed and adjusting the infrastructure. For example, an operator may relocate if the current node is overwhelmed or possibly replicate if its workload increases. However, the operator can only adjust once the infrastructure has recognized a need (and, thus, when a problem is already occurring). The techniques provided herein simulate the forthcoming load, which automatically influences the environment to adjust so that the environment is already adjusted when real data streams arrive.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (e.g., processing elements), as well as by replicating processing elements on multiple nodes and balancing a load among the replicated processing elements. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. In addition, stream operators in the same operator graph may be hosted on different nodes, e.g., on different computing nodes or on different cores of a computing node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. Additionally, a tuple may include metadata (e.g., about the tuple). A tuple may be extended by adding one or more additional attributes (or metadata) thereto. As used herein, "stream" or "data stream" refers to a sequence of tuples. Generally, a stream may be considered a pseudo-infinite sequence of tuples.

As a tuple is processed by stream operators, the tuple may be changed in some manner. For example, one or more attribute or metadata may be added, deleted, or modified. Often, a stream operator may change a single attribute. Generally, a particular tuple output by a stream operator or processing element may not be considered to be the same tuple as a corresponding input tuple, even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

FIG. 1 illustrates one exemplary computing infrastructure 100 that may be configured to execute a stream computing application, according to some embodiments. The computing infrastructure 100 includes a management system 105 and two or more computing nodes 110A-110D—e.g., hosts—which are communicatively coupled to each other using one or more communications networks 120. The communications network 120 may include one or more servers, networks, or databases, and may use a particular communication protocol to transfer data between the computing nodes 110A-110D. A server 102 may also be communicatively coupled with the management system 105 and the computing nodes 110 either directly or via the communications network 120.

Figure 3:
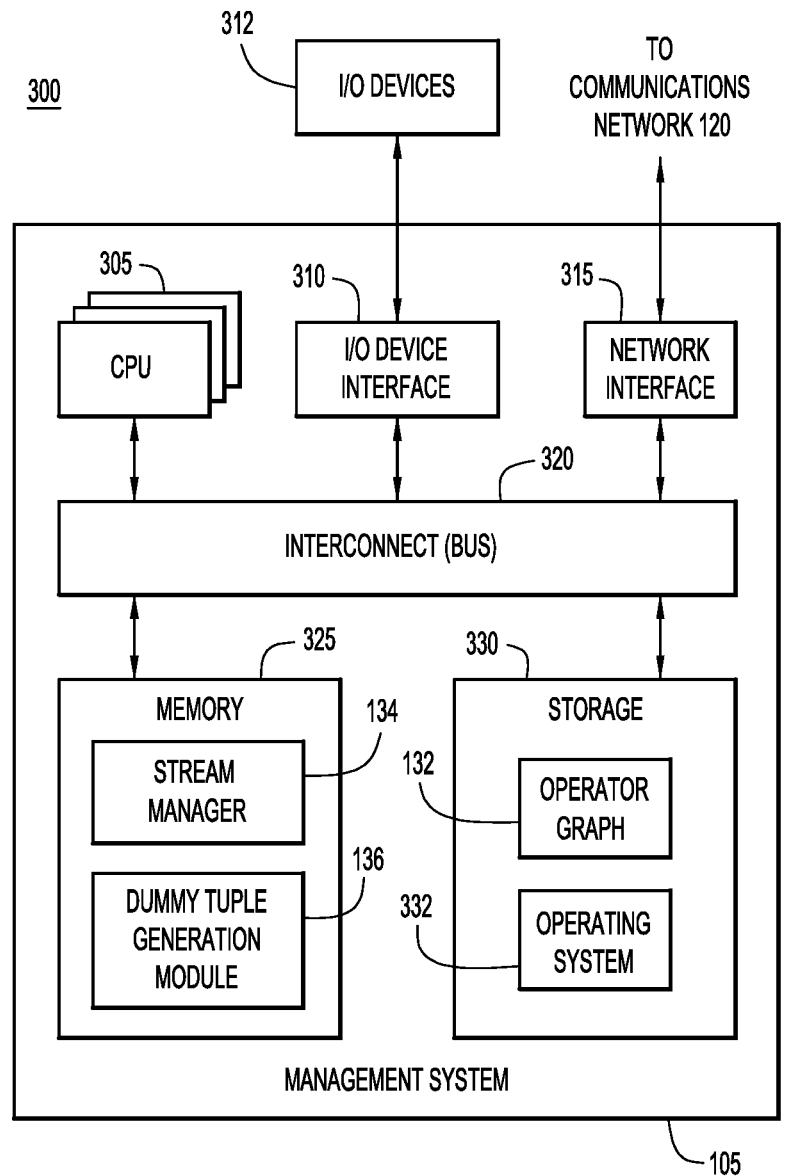
FIG. 3 is a block diagram of the management system of FIG. 1, according to an embodiment of the present invention.

The management system 105 can control the management of the computing nodes 110A-110D (discussed further on FIG. 3). The management system 105 can have an operator graph 132 with one or more stream operators and a stream manager 134 to control the management of the stream of tuples in the operator graph 132. The management system 105 also includes a dummy tuple generation module 136 configured to generate and introduce dummy tuples into the operator graph 132. As is discussed in more detail below, the stream manager 134 may act in concert with and/or in response to operations of the dummy tuple generation module 136, such that the operator graph 132 is automatically adjusted in response to the generation and introduction of dummy tuples into the operator graph 132.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
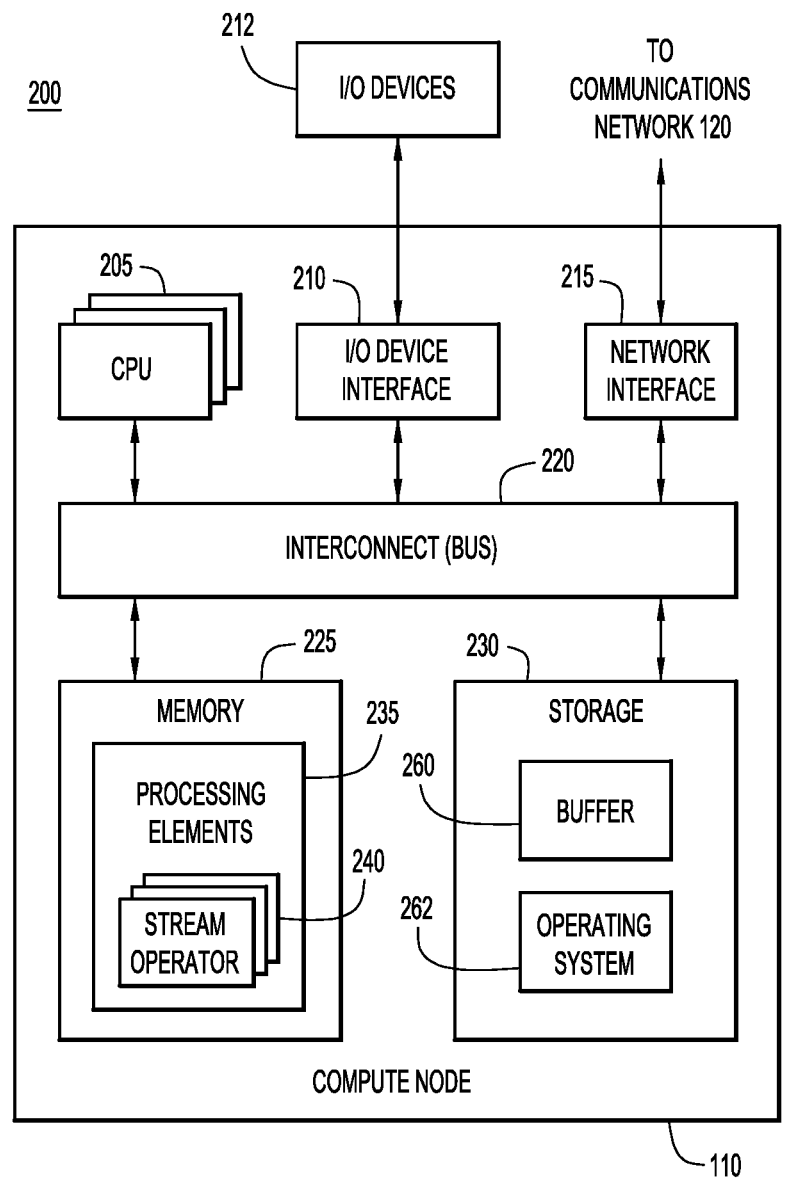
FIG. 2 is a block diagram of a computing node of FIG. 1, according to an embodiment of the present invention.

FIG. 2 is a more detailed view of a computing node 110, which may be the same as one of the computing nodes 110A-110D of FIG. 1, according to an example embodiment. The computing node or device is only one example of a suitable computing node for computing environment 100 and is not intended to suggest any limitation as to the scope of use or functionality of embodiments of the invention described herein. Computing node 110 may be described in the general context of computer system executable instructions, such as program modules, being executed by a computer system. Generally, program modules may include routines, programs, objects, components, logic, data structures, and so on that perform particular tasks or implement particular abstract data types. Computing node 110 may be practiced in distributed cloud computing environments where tasks are performed by remote processing devices that are linked through a communications network. In a distributed cloud computing environment, program modules may be located in both local and remote computer system storage media including memory storage devices.

The computing node 110 may include, without limitation, one or more processors (CPUs) 205, a network interface 215, an interconnect 220, a memory 225, and a storage 230 and is capable of being implemented and/or performing any of the functionality set forth herein. The computing node 110 may also include an I/O device interface 210 used to connect I/O devices 212 to the computing node 110.

The interconnect 220 is used to transmit programming instructions and application data between each CPU 205, I/O device interface 210, storage 230, network interface 215, and memory 225. The interconnect 220 may be one or more busses, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Each CPU 205 retrieves and executes programming instructions stored in the memory 225 or storage 230. Similarly, the CPU 205 stores and retrieves application data residing in the memory 225. The CPUs 205 may be a single CPU, multiple CPUs, or a single CPU having multiple processing cores in various embodiments. In one embodiment, a processor 205 may be a digital signal processor (DSP). More generally, each CPU 205 is operational with numerous other general purpose or special purpose computing system environments or configurations. Examples of well-known computing systems, environments, and/or configurations that may be suitable for use with computing node 110 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computing node 110 may communicate with one or more external devices 212, such as a keyboard, a pointing device, a display, etc.; one or more devices that enable a user to interact with computing node 110; and/or any devices (e.g., network card, modem, etc.) that enable computing node 110 to communicate with one or more other computing devices. Such communication can occur via Input/Output (I/O) interface 210. Still yet, computing node 110 can communicate with one or more networks, such as network 120, via network interface 215. As depicted, network interface 215 communicates with the other components of computing node 110 via bus 220. It should be understood that although not shown, other hardware and/or software components could be used in conjunction with computing node 110. Examples, include, but are not limited to: microcode, device drivers, redundant processing units, external disk drive arrays, RAID systems, tape drives, and data archival storage systems, etc.

Computing node 110 typically includes a variety of computer system readable media. Such media may be any available media that is accessible by computing node 110, and it includes both volatile and non-volatile media, removable and non-removable media. The memory 225 is generally included to be representative of a random access memory (RAM), e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. By way of example only, storage system 230 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 220 by one or more data media interfaces. As will be further depicted and described below, memory 225 may include at least one program product having a set (e.g., at least one) of program modules that are configured to carry out the functions of embodiments of the invention.

Still referring to FIG. 2, one or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same computing node 110 or on other computing nodes that are accessible via communications network 120. For example, a processing element 235 on computing node 110A may output tuples to a processing element 235 on computing node 110B.

The storage 230 may include a buffer 260. Although shown as being in storage, the buffer 260 may also be located in the memory 225 of the computing node 110 or in a combination of both memories. Moreover, storage 230 may include storage space that is external to the computing node 110, such as in a cloud.

The computing node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

FIG. 3 is a more detailed view of the management system 105 of FIG. 1 according to some embodiments. The management system 105 depicted in FIG. 3 is only one example of a suitable management system for computing environment 100 and is not intended to suggest any limitation as to the scope of use or functionality of embodiments of the invention described herein. Similar to computing node 110, the management system 105 may be described in the general context of computer system executable instructions, such as program modules, being executed by a computer system. As mentioned, program modules may include routines, programs, objects, components, logic, data structures, and so on that perform particular tasks or implement particular abstract data types. Management system 105 may also be practiced in distributed cloud computing environments where tasks are performed by remote processing devices that are linked through a communications network. In a distributed cloud computing environment, program modules may be located in both local and remote computer system storage media including memory storage devices.

The management system 105 may include, without limitation, one or more processors (CPUs) 305, a network interface 315, an interconnect 320, a memory 325, and a storage 330 and is capable of being implemented and/or performing any of the functionality set forth herein. The management system 105 may also include one or more operating systems 332 stored partially in memory 325 and/or storage 330, and an I/O device interface 310 connecting I/O devices 312, e.g., keyboard, display, and mouse devices, to the management system 105. The description of corresponding components/elements in computing device 110 included above may also apply to these components/elements. For example, each CPU 305 retrieves and/or executes application data and programming instructions stored in the memory 325 or storage 330. The interconnect 320 is used to move data, such as programming instructions and application data, between the CPU 305, I/O device interface 310, storage unit 330, network interface 315, and memory 325. The operating system 332 provides an interface between various hardware resources, including the CPU 305, and processing elements and other components of the stream computing application.

Additionally, the memory 325 may store a stream manager 134 and a dummy tuple generation module 136 while the storage 330 may store an operator graph 132. The operator graph 132 may define how tuples are routed to processing elements 235 (FIG. 2) for processing. The modules and manager (e.g., including dummy tuple generation module 136) generally carry out the functions and/or methodologies of embodiments of the invention as described herein.

Figure 4:
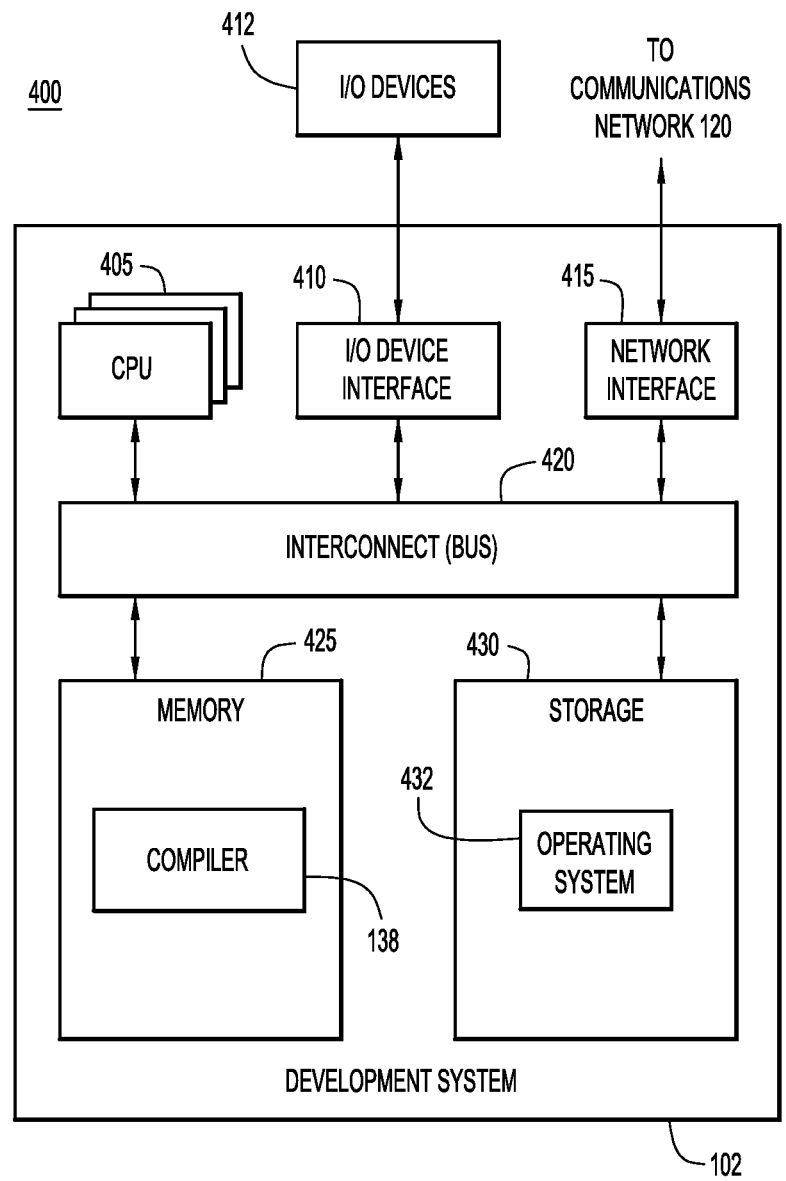
FIG. 4 is a block diagram of the compiler system of FIG. 1, according to an embodiment of the present invention.

FIG. 4 is a more detailed view of the development system 102 of FIG. 1 according to some embodiments. The development system 102 depicted in FIG. 3 is only one example of a suitable development system for computing environment 100 and is not intended to suggest any limitation as to the scope of use or functionality of embodiments of the invention described herein. Similar to computing node 110 and the management system 105, the development system 102 may be described in the general context of computer system executable instructions, such as program modules, being executed by a computer system. As mentioned, program modules may include routines, programs, objects, components, logic, data structures, and so on that perform particular tasks or implement particular abstract data types. Development system 102 may also be practiced in distributed cloud computing environments where tasks are performed by remote processing devices that are linked through a communications network. In a distributed cloud computing environment, program modules may be located in both local and remote computer system storage media including memory storage devices.

The development system 102 may include, without limitation, one or more processors (CPUs) 405, a network interface 415, an interconnect 420, a memory 425, and storage 430. The compiler system 102 may also include one or more operating systems 432 stored partially in memory 425 and/or storage 430, and an I/O device interface 410 connecting I/O devices 412, e.g., keyboard, display, and mouse devices, to the compiler system 102. The description of corresponding components/elements in computing device 110 included above may also apply to these components/ elements. For example, each CPU 405 retrieves and/or executes application data and programming instructions stored in the memory 425 or storage 430. The interconnect 420 is used to move data, such as programming instructions and application data, between the CPU 405, I/O device interface 410, storage unit 430, network interface 415, and memory 425. The operating system 432 provides an interface between various hardware resources, including the CPU 405, and processing elements and other components of the stream computing application.

In addition to these components, the memory 425 may store a compiler 138. The compiler 138 compiles modules, which include source code or statements, into the object code, which includes machine instructions that execute on a processor. In one embodiment, the compiler 138 may translate the modules into an intermediate form before translating the intermediate form into object code. The compiler 138 may output a set of deployable artifacts that may include a set of processing elements and an application description language file (ADL file), which is a configuration file that describes the stream computing application. In some embodiments, the compiler 138 may be a just-in-time compiler that executes as part of an interpreter. In other embodiments, the compiler 138 may be an optimizing compiler. In various embodiments, the compiler 138 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 138 may be represented by an operator graph, e.g., the operator graph 132 of FIG. 1.

The compiler 138 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple computing nodes with the benefit of faster inter-operator communications. The compiler 138 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
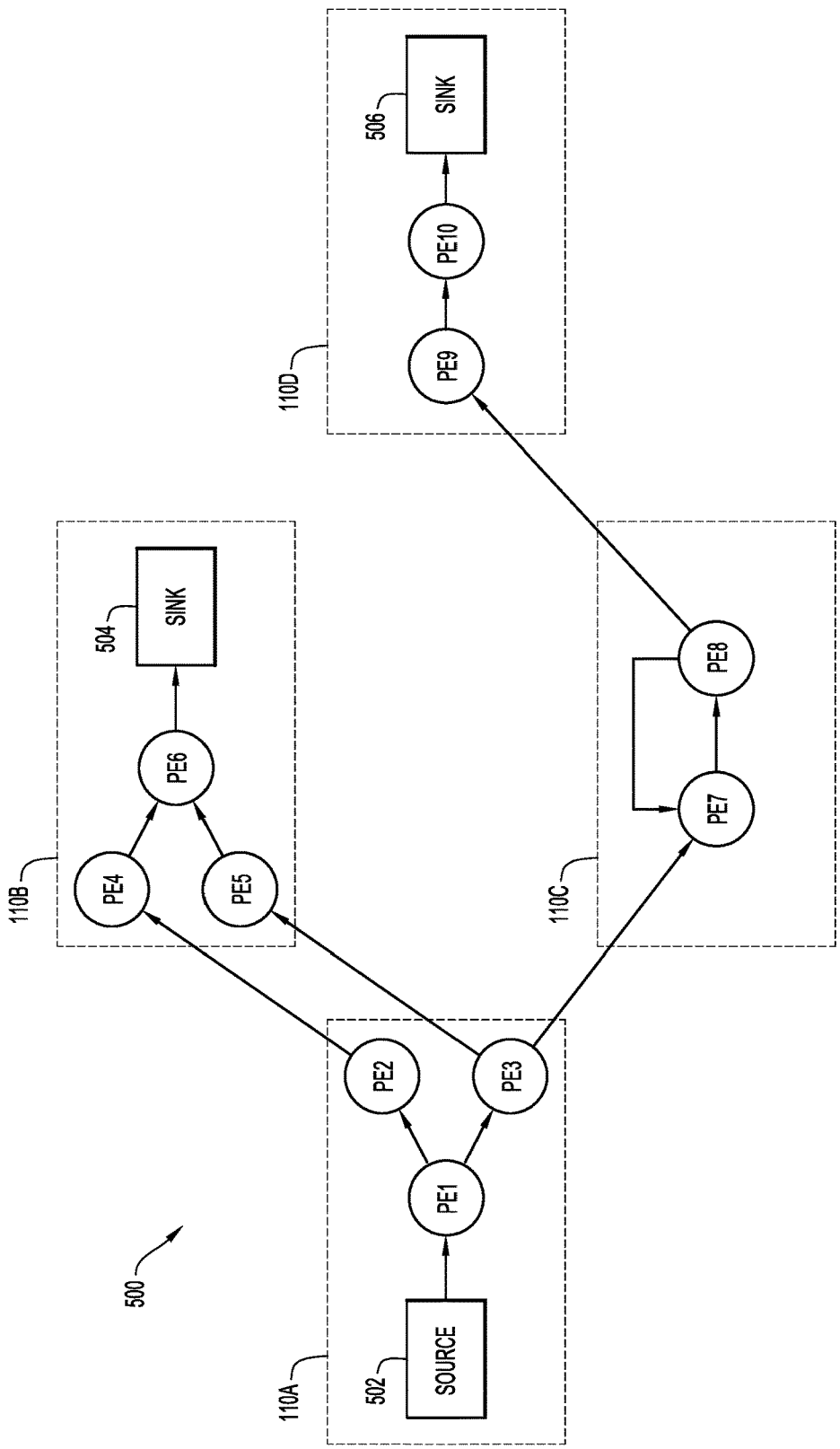
FIG. 5 illustrates an operator graph for a stream computing application according to an embodiment of the present invention.

FIG. 5 illustrates an exemplary operator graph 500 for a stream computing application beginning from one or more sources 502 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together. For the purposes of this application, operator graphs include at least one dynamic processing element (and/or operator), such that the operator graph can be dynamically adjusted when necessary. For example, a processing element can be moved between computing nodes and/or between execution paths for load balancing.

The operator graph 132 can encompass one or more processing elements, e.g., PE2 and PE4 from FIG. 5, which may each lie on a computing node, e.g., 110A and 110B, respectively. The example operator graph shown in FIG. 5 includes ten processing elements (labeled as PE1-PE10) running on the computing nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 502 and ends at a sink 504, 506. Computing node 110A includes the processing elements PE1, PE2, and PE3. Source 502 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on computing node 110B. Likewise, the tuples output by PE4 flow to operator PE6 and then to sink 504. Similarly, tuples flowing from PE3 to PE5 also reach sink 504 via PE6. Thus, for this example operator graph, PE6 could be configured to perform a join operation, combining tuples received from PE4 and PE5. This example operator graph also shows tuples flowing from PE3 to PE7 on computing node 110C, which itself shows tuples flowing to PE8 and looping back to PE7. Tuples output from PE8 flow to PE9 on computing node 110D, which in turn outputs tuples to be processed by operators in PE10 in route to sink 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on computing nodes, e.g., computing nodes 110A-110D, as well as to change the deployment of an operator graph, e.g., operator graph 132. The stream manager 134 may move processing elements from one computing node 110 to another, for example, to manage the processing loads of the computing nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the computing nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
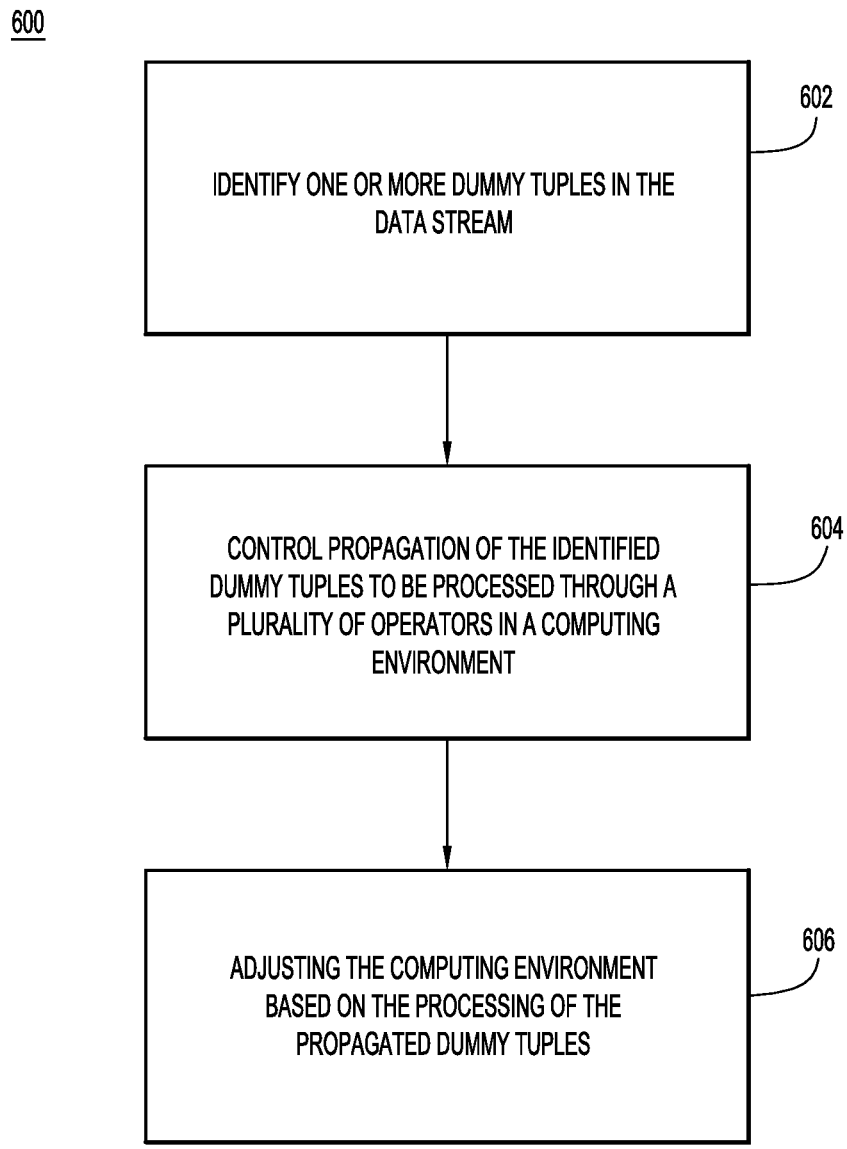
FIG. 6 is a procedural flow chart of adjusting a computing environment for processing a data stream, according to a present invention embodiment.

With reference now to FIG. 6, procedural flow chart 600 depicts operations (e.g., of the stream manager 134) for controlling adjustment of a computing environment and, in particular, a stream computing environment. Initially, at step 602, one or more dummy tuples are recognized in a data stream flowing through an operator graph. Dummy tuples may be recognized in a variety of manners, such as by recognizing a specific attribute included in only dummy tuples or by analyzing a percentage flow rate. Some example techniques for identifying dummy tuples are discussed in further detail in connection with FIG. 8.

At step 604, propagation of the dummy tuples through the operator graph is controlled as needed. For example, if a specific application will require additional resources, the dummy tuples can be sent through the resources (e.g., operators) associated with the application. The dummy tuples are not introduced and controlled in an offline simulation. Instead, the dummy tuples are introduced to an online stream computing environment, where workloads are dynamic and the environment is elastic growing/shrinking with the resource needs. Consequently, the dummy tuples may change or manipulate the performance metrics inherent to a stream computing environment and influence the environment to adapt, thereby increasing performance for an application operating, or soon to be operating, in the environment.

Based on the propagation of the dummy tuples, the operator graph may be adjusted (e.g., by the stream manager 134), at step 606, so that resources are allocated appropriately. In other words, the computing environment may dynamically adjust to the loads on the system created by the dummy tuples. As mentioned above, the dummy tuples may cause the computing environment to adjust by influencing preexisting performance metrics. However, since the loads (and, thus, the changes in performance metrics) are created by dummy tuples, there will not be a wait of lag time when the "real" tuples from an application are propagated through the computing environment. As an example, if the dummy tuples create significant loads on particular computing nodes, the placement of operators and/or processing elements can be adjusted, by co-locating, segregating, or otherwise adjusting the operators and processing elements. Additionally or alternatively, operators may be fused or unfused, processing elements may be replicated, and/or operators and processing elements may be otherwise modified.

In some embodiments, as the computing environment is adjusted, the computing environment may be unaware of the dummy tuples and the computing environment may dynamically adjust in the same manner as it typically does to accommodate shifting flows and loads. However, now, the computing environment will be adjusted prior to receiving loads from an application (as opposed to adjusting while attempting to process a load). In other words, the techniques provided herein provide a framework that processes dummy tuples and adjusts the computing environment accordingly. An application operating in the computing environment may be aware of the infrastructure and chose to send dummy tuples downstream. This allows the application to dictate when the environment needs to adjusted. By understanding the dummy tuple framework, an application developer can easily manipulate the flow of dummy tuples. For example, the developer can set an attribute to specify how often the dummy tuple should be forwarded which, in turn, may control the extent to which the environment is adjusted.

Figure 7:
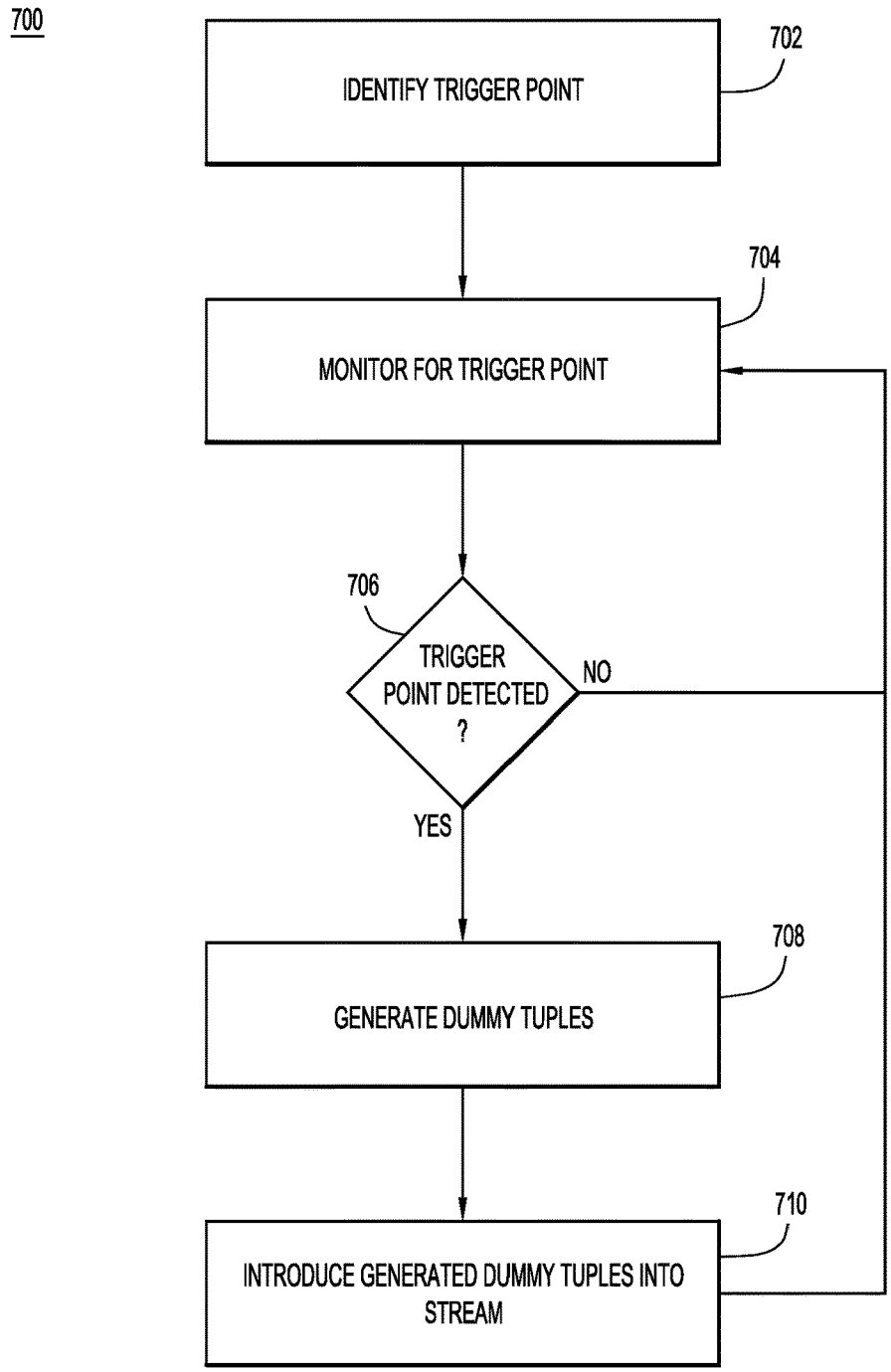
FIG. 7 is a procedural flowchart depicting generation and implementation of dummy tuples to adjust a computing environment, according to a present invention embodiment.

In FIG. 7, procedural flow chart 700 depicts operations (e.g., of the dummy tuple generation module 136) for generating and introducing dummy tuples into a stream computing environment. Initially, at step 702, a trigger point is identified. The trigger point may be or include an attribute on an operator, a flow rate of tuples, and/or a load on an operator. For example, if a load on an operator is higher than any other loads on other operators in the computing environment or higher than an average load for the computing environment, this may serve as a trigger point. Alternatively, the load may serve as a trigger point if it satisfies a predetermined threshold (which may be statically input/determined/received or dynamically determined). Still further, a trigger point may simply be a time of day or some other event (perhaps determined based on data extracted from external databases). For example, if certain data is always released between 5:00-5:02 pm and processed in the computing environment thereafter, 5:00 pm may be established as a daily trigger point.

At step 704, monitoring is conducted for one or more identified trigger points. In the simple time example explained above, the monitoring may simply check the time of day; however, in other embodiments, monitoring may require an analysis of operator processing, an analysis of external data, or any other such operations. As shown in FIG. 7, monitoring continues until a trigger point is detected. If the trigger point is detected at step 706, dummy tuples may be generated at step 708.

At step 708, dummy tuples are generated (e.g., by or in response to instructions from the dummy tuple generating module 136). In some embodiments, dummy tuples are generated by cloning tuples and marking them as dummy tuples. Consequently, the dummy tuples will contain the same attributes as the existing tuples (e.g., real tuples), but include an attribute that allows the dummy tuples to be identified as dummy tuples. In some of these embodiments, the cloned tuples may be tuples arriving at an operator (and, thus, the dummy tuples are generated by the operator itself). Additionally or alternatively, historical tuples may serve as the cloning source. Either way, when a dummy tuple is created via cloning, the tuples may accurately simulate a real flow of tuples.

In some embodiments, dummy tuples may be generated by creating specific types of dummy tuples, either in addition to or as an alternative to cloned tuples. If the dummy tuple is intended to simulate a load, the created dummy tuples may have attributes that are really small or really large in order to force the environment to react in different ways. For example, a created dummy tuple with attributes of large data may cause the computing environment to move additional resources (e.g., processing elements) to the data stream processing the dummy tuples. By comparison, created dummy tuples with attributes of small data may allow the computing environment to move resources (e.g., processing elements) to other data streams. If the created dummy tuples are intended to simulate a flow, the dummy tuples may have any attributes and may be introduced into a data stream in a specific manner (e.g., pulsed in bunches). When dummy tuples are created, historical data and historical tuple sizes may be used to make the created dummy tuple appear to be real.

At step 710, the generated dummy tuples are introduced into a data stream and sent downstream. Each different type of dummy tuple (e.g., cloned existing, cloned historical, and created) may create slightly different simulations once introduced into a stream. Cloned existing tuples may simulate the current flow and load most accurately, while cloned historical tuples may effectively simulate historical load and flow. Meanwhile, created tuples may best simulate a desired load and flow. As mentioned, if the dummy tuples are intended to control or adjust flow, the dummy tuples may be introduced very slowly, in bursts, or in any other manner, to achieve different results. In some embodiments, there may be two streams between two operators and one stream may be used for dummy tuples so that dummy tuples may be introduced at a specific input port (which may allow the tuples to be identified as dummy tuples). Regardless of how dummy tuples are generated and introduced to a data stream, once introduced, the dummy tuples are sent downstream to meet a desired flow rate or condition.

Figure 8:
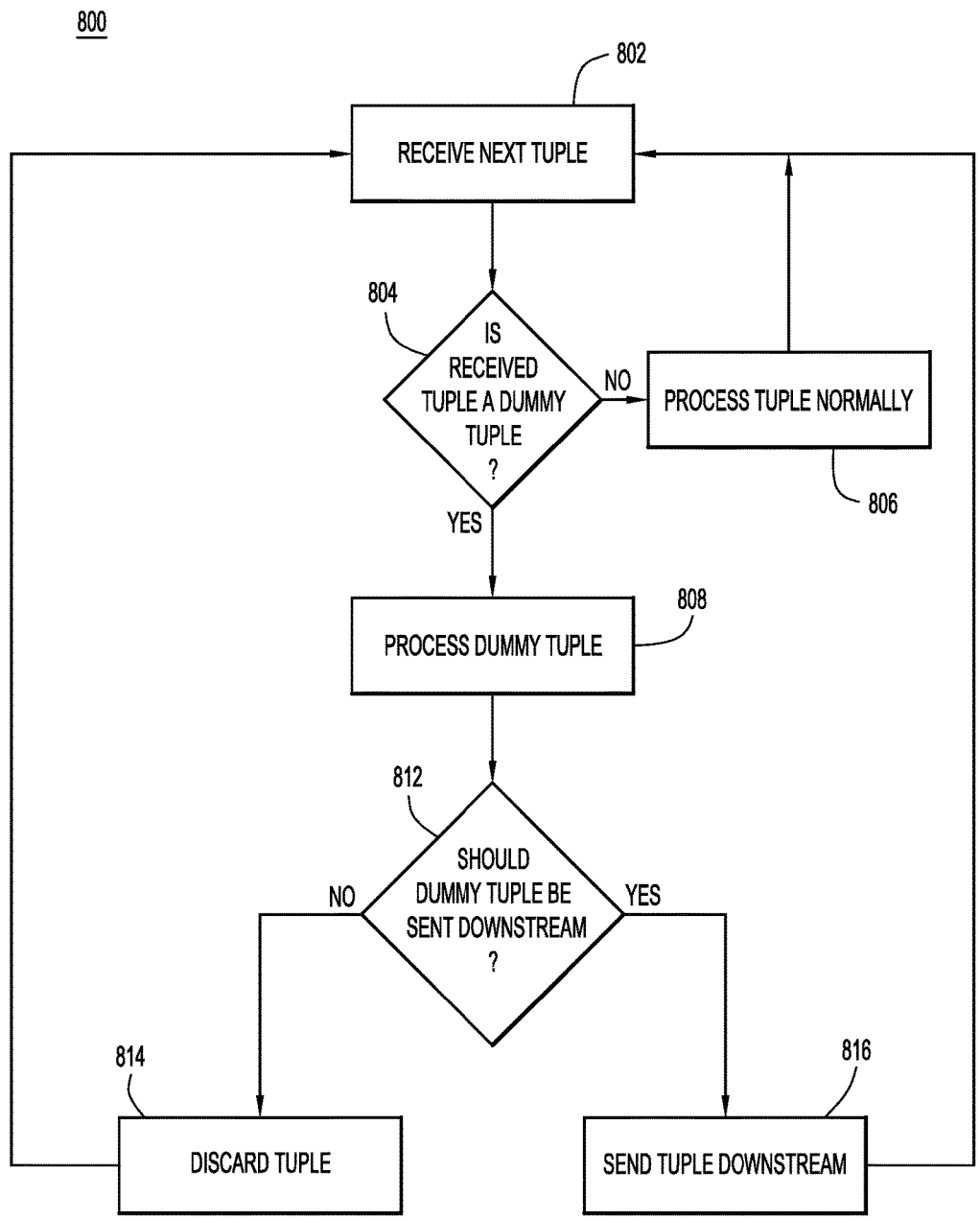
FIG. 8 is a procedural flow chart of operations of an operator for adjusting a computing environment for processing a data stream, according to a present invention embodiment.

In FIG. 8, procedural flow chart 800 depicts operations (e.g., of an operator based on instructions from the stream manager 134) for controlling the processing of dummy tuples at a computing node in a stream computing environment. Initially, at step 802, an operator receives new tuples. The operator then determines, at step 804, whether the new tuples are dummy tuples. This determination can be made in a variety of manners, depending on how the dummy tuples are generated and introduced. For example, if a dummy tuple is generated by cloning and marking, a dummy tuple may be identified by identifying a special tuple attribute and/or value, such as an attribute value pair "dummy=true." As another example, if dummy tuples are only introduced at a specific input port, dummy tuples may be identified based on an indication that the tuple came from a "dummy port." In yet another embodiment, the processing of the tuple may indicate it is a dummy tuple (the computation of a value results in "not a number"). Still further, a dummy tuple may have a unique size that indicates its nature.

If, at step 804, a received tuple is determined to be a dummy tuple, it is processed at step 808. If not, the tuple is processed normally at step 806. In some embodiments, an operator may be unaware of whether a received tuple is a dummy tuple or not and, thus, may process the tuple in the same manner regardless of whether it is a dummy tuple. For example, if an operator searches for a string in an attribute value, then this processing may be performed on dummy and non-dummy tuples. However, if processing a dummy tuple would negatively impact the computing environment and/or prevent the computing environment from being adjusted as desired (e.g., sending more processing elements to a certain data stream), the dummy tuple may not be processed by the operator (e.g., the operator may perform no operation). For example, if a value is saved in the operator state, then that part of the processing may be omitted. The goal is to simulate the load and flow without affecting (e.g., changing the state) the operator. In at least some embodiments, this goal may be achieved by applying a set of rules to the operators, either individually or globally, indicating the processing to be performed by different operators for dummy tuples.

At step 812, a determination is made as to whether the dummy tuple should be sent downstream. In some embodiments, a specific attribute on the dummy tuple may provide an indication as to whether the dummy tuple should be sent downstream. Additionally or alternatively, an analysis of the computing environment may be performed to determine if the goal of the dummy tuples has been achieved. For example, analysis can be performed to determine whether additional resources (e.g., processing elements) have been allocated to a particular data stream or application or whether flow has been increased by a certain percentage (e.g., 10%).

Additionally or alternatively, specific operators in the computing environment can be analyzed and specific rules can be applied to specific operators to determine how dummy tuples should be passed downstream. For example, if the operator is a filter operator, the filter operator checks a specific attribute and either throws the current tuple away or sends it downstream. In order to mimic this operational behavior for dummy tuples, the filter may be instructed to recognize dummy tuples and only forward on some of the dummy tuples. The forwarding rate can be determined by current (or historical) flow rates of the operator, current (or historical) tuple filter rates or specific attributes on the dummy tuple. By comparison, if the operator is a join operator, the join operator sends on tuples that share a common attribute. In order to mimic this operational behavior for dummy tuples, the join operator may be instructed to recognize a dummy tuple and only sends on the some of the dummy tuples. Again, the forwarding rate can be determined by a variety of factors such as the flow rate, a matching attribute, or an actual match to an existing value in the join window. Still further, in some embodiments, an external trigger value can be reviewed or analyzed to determine in the dummy tuple should be sent downstream.

If the dummy tuple should be sent downstream, the tuple is sent at step 816. Otherwise, the tuple is discarded at 814. In some embodiments, when a dummy tuple is sent downstream, the input dummy tuple is not actually sent downstream. Instead, a new dummy tuple may be generated and sent downstream. Subsequently, a new (or next) tuple can be received and the same steps may be repeated.

The techniques provided herein have a number of advantages. As one example, dynamically adjusting the environment with dummy tuples adjusts a computing environment prior to upcoming needs, so there is no wait for resources. The computing environment is adjusted while online and requires minimal offline planning. Moreover, since the techniques provided herein take advantage of the elastic nature of a stream computing environment and dynamically adjust the environment to increase performance for applications operating in the environment, the techniques provided herein can be implemented with minimal cost and time. As a result of the techniques provided herein, applications may be provided with the necessary resources as needed. Additionally or alternatively, the techniques provided herein may serve to preserve resources on a specific data path (e.g., for an application) by maintaining a flow of dummy tuples during slow or down times. Put generally, the techniques provided herein resolve a technical problem that is necessarily rooted in computer technology and, in particular, stream computing technology.

It will be appreciated that the embodiments described above and illustrated in the drawings represent only a few of the many ways of implementing embodiments for adjusting a computing environment for processing a data stream with dummy tuples.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, dummy tuple generation module 136, etc.). These systems may include any types of monitors and input devices (e.g., keyboard, mouse, voice recognition, etc.) to enter and/or view information.

It is to be understood that the software (e.g., dummy tuple generation module 136) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., local area network (LAN), wide area network (WAN), Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., dummy tuple generation module 136) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

The system may employ any number of any conventional or other databases, data stores or storage structures (e.g., files, databases, data structures, data or other repositories, etc.) to store information (e.g., tuple attributes, historical tuple information, etc.). The database system may be implemented by any number of any conventional or other databases, data stores or storage structures (e.g., files, databases, data structures, data or other repositories, etc.) to store information (e.g., tuple attributes, historical tuple information, etc.). The database system may be included within or coupled to the server and/or client systems. The database systems and/or storage structures may be remote from or local to the computer or other processing systems, and may store any desired data (e.g., tuple attributes, historical tuple information, etc.).

The present invention embodiments may employ any number of any type of user interface (e.g., Graphical User Interface (GUI), command-line, prompt, etc.) for obtaining or providing information (e.g., e.g., tuple attributes, historical tuple information, etc.) where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touchscreen, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture, instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of adjusting a computing environment for processing a data stream comprising:
    identifying one or more dummy tuples in the data stream processed by the computing environment during an online mode of operation, wherein the data stream further comprises real data tuples of an application load with resource requirements;
    controlling propagation of the identified dummy tuples to be processed through a plurality of operators in the computing environment during the online mode of operation to manipulate performance metrics and control adjustment of the computing environment during the online mode of operation for the application load; and
    adjusting the computing environment during the online mode of operation to meet the resource requirements of the application load based on the manipulated performance metrics from processing of the propagated dummy tuples and prior to processing the real data tuples of the application load.

2. The method of claim 1, wherein the plurality of operators process the identified dummy tuples without modifying their state.

3. The method of claim 1, wherein controlling propagation of the identified dummy tuples comprises:
    enabling propagation of the identified dummy tuples through the plurality of operators based on one or more criteria.

4. The method of claim 1, wherein controlling propagation of the identified dummy tuples comprises:
    generating new dummy tuples from existing tuples and propagating the new dummy tuples through the plurality of operators.

5. The method of claim 1, further comprising:
    upon detecting a trigger point, generating the one or more dummy tuples; and
    introducing the generated dummy tuples to the data stream based on the trigger point.

6. The method of claim 1, wherein the plurality of operators includes a filter operator, and controlling propagation of the identified dummy tuples comprises:
    controlling propagation of the identified dummy tuples from the filter operator based on one or more from a group of flow rates of the filter operator, tuple filter rates of the identified dummy tuples, and specific attributes of the identified dummy tuples.

7. The method of claim 1, wherein the plurality of operators includes a join operator, and controlling propagation of the identified dummy tuples comprises:
    controlling propagation of the identified dummy tuples from the join operator based on one or more from a group of flow rates of the join operator, a matching attribute for a join operation, and a match to an existing value in a join window.

8. The method of claim 1, wherein controlling propagation of the identified dummy tuples comprises:
    controlling propagation of the identified dummy tuples based on an attribute specifying a frequency for propagating the identified dummy tuples.

9. A system for adjusting a computing environment for processing a data stream comprising:
    a processor configured to:
        identify one or more dummy tuples in the data stream processed by the computing environment during an online mode of operation, wherein the data stream further comprises real data tuples of an application load with resource requirements;

control propagation of the identified dummy tuples to be processed through a plurality of operators in the computing environment during the online mode of operation to manipulate performance metrics and control adjustment of the computing environment during the online mode of operation for the application load; and adjust the computing environment during the online mode of operation to meet the resource requirements of the application load based on the manipulated performance metrics from processing of the propagated dummy tuples and prior to processing the real data tuples of the application load.

10. The system of claim 9, wherein in controlling propagation of the identified dummy tuples, the processor is further configured to:

enable propagation of the identified dummy tuples through the plurality of operators based on one or more criteria.

11. The system of claim 9, wherein in controlling propagation of the identified dummy tuples, the processor is further configured to:

generate new dummy tuples from existing tuples and propagate the new dummy tuples through the plurality of operators.

12. The system of claim 9, wherein the processor is further configured to:

upon detecting a trigger point, generate the one or more dummy tuples; and introduce the generated dummy tuples to the data stream based on the trigger point.

13. The system of claim 9, wherein the plurality of operators includes a filter operator, and in controlling propagation of the identified dummy tuples, the processor is further configured to:

control propagation of the identified dummy tuples from the filter operator based on one or more from a group of flow rates of the filter operator, tuple filter rates of the identified dummy tuples, and specific attributes of the identified dummy tuples.

14. The system of claim 9, wherein the plurality of operators includes a join operator, and in controlling propagation of the identified dummy tuples, the processor is further configured to:

control propagation of the identified dummy tuples from the join operator based on one or more from a group of flow rates of the join operator, a matching attribute for a join operation, and a match to an existing value in a join window.

15. The system of claim 9, wherein in controlling propagation of the identified dummy tuples, the processor is further configured to:

control propagation of the identified dummy tuples based on an attribute specifying a frequency for propagating the identified dummy tuples.

16. A computer program product for adjusting a computing environment for processing a data stream, the computer program product comprising a computer readable storage medium having program instructions embodied therewith, the program instructions executable by a processor to cause the processor to:

identify one or more dummy tuples in the data stream processed by the computing environment during an online mode of operation, wherein the data stream further comprises real data tuples of an application load with resource requirements;

control propagation of the identified dummy tuples to be processed through a plurality of operators in the computing environment during the online mode of operation to manipulate performance metrics and control adjustment of the computing environment during the online mode of operation for the application load; and adjust the computing environment during the online mode of operation to meet the resource requirements of the application load based on the manipulated performance metrics from processing of the propagated dummy tuples and prior to processing the real data tuples of the application load.

17. The computer program product of claim 16, further comprising program instructions executable by the processor to cause the processor to:

generate new dummy tuples from existing tuples and propagate the new dummy tuples through the plurality of operators.

18. The computer program product of claim 16, wherein the plurality of operators includes a filter operator, and the instructions executable by the processor to cause the processor to control propagation of the identified dummy tuples further comprise instructions executable by the processor to cause the processor to:

control propagation of the identified dummy tuples from the filter operator based on one or more from a group of flow rates of the filter operator, tuple filter rates of the identified dummy tuples, and specific attributes of the identified dummy tuples.

19. The computer program product of claim 16, wherein the plurality of operators includes a join operator, and the instructions executable by the processor to cause the processor to control propagation of the identified dummy tuples further comprise instructions executable by the processor to cause the processor to:

control propagation of the identified dummy tuples from the join operator based on one or more from a group of flow rates of the join operator, a matching attribute for a join operation, and a match to an existing value in a join window.

20. The computer program product of claim 16, further comprising program instructions executable by the processor to cause the processor to:

control propagation of the identified dummy tuples based on an attribute specifying a frequency for propagating the identified dummy tuples.

\* \* \* \* \*